Patented Oct. 9, 1934

1,976,165

UNITED STATES PATENT OFFICE 1,976,165

BACON SAUSAGE

Walter Frank, Milwaukee, Wis.

No Drawing. Application October 19, 1933, Serial No. 694,345

4 Claims. (Cl. 99—11)

This invention relates to manufactured meat products and the present application is a continuation-in-part of my co-pending application, Serial No. 650,049, filed January 3, 1933.

The present invention has for its general object the provision of a sausage simulative in appearance of fresh pork sausage, but having superior keeping qualities to fresh pork sausage, comprising an unsmoked intestinal skin filled with comminuted bacon selected in such proportions from the loin and belly cuts as to have the proper fat content to coat the lean particles when the comminuted mass is mixed preparatory to being stuffed into the skin, the mass having substantially the consistency of fresh pork sausage meat.

A more specific object of the invention is the provision of a sausage simulative in appearance of fresh pork sausage comprising the unsmoked animal skin stuffed with comminuted bacon, the keeping qualities inherent in the stuffing being imparted to the skin through the absorption by the skin of the creosote from the smoked stuffing without substantial deterioration in the transparency thereof.

Still another object of the invention is the provision of a sausage including the unsmoked casing stuffed with comminuted bacon so blended with respect to its fat content and treated, by mixing after comminution, as to have substantially the appearance and consistency of fresh pork sausage meat, being amenable to the same methods of cooking and resulting in a cooked product which is in fact bacon, but which will not crumble and fall apart as would comminuted bacon.

Still another object of the invention is the provision of a new food product comprising comminuted bacon in a new form in which it may be fried evenly throughout and without the ordinary fault of curling in the frying pan which attends the cooking of sliced bacon.

Other objects of the invention will appear as the following description of a preferred and practical embodiment thereof proceeds.

It is of course old in the art to pack various meats in comminuted form and various cuts of pork in sausage skins, but it has heretofore never been attempted insofar as applicant is aware to package bacon in the form of stuffed sausage.

Sausages are of course of various kinds, the term being loosely employed to denote any form of meat product put up in sausage casings or other units of link form. It is highly desirable that the sausage in the present invention should simulate fresh pork sausage since it is the purpose of the invention to produce an article which shall suggest the same methods of cooking and serving as are practiced with regard to fresh pork sausage. For this same reason, it is important that the sausage of the present invention be distinguished from a red smoked skin sausage such as frankfurters or sausage with dried cured interiors as for example the various products which go under the general name of bologna sausages or "summer" sausages.

It is also the purpose of the present invention to provide a sausage which shall not only simulate the fresh sausage in appearance and in the consistency of its stuffing, but which shall have keeping qualities far in excess of the keeping qualities of the fresh pork sausage, which latter qualities may be regarded as practically nil.

Applicant therefore employs for the stuffing of his sausage comminuted cured and smoked bacon having inherent keeping qualities and which imparts these qualities to the casing through absorption of the smoke principle from the stuffing outward into the skin without reddening the skin as would take place if the sausage were hung in the smokehouse, and therefore without impairing the transparent nature of the skin through which the natural color of the stuffing is revealed, thereby giving it the appearance of a fresh sausage.

In preparing the stuffing for the sausage of the present invention, it is essential that a certain fat content be provided in order that the stuffing may have the consistency of fresh sausage meat and to insure that when cooked it will not crumble into a loose deherent mass.

Bacon from the loin cut is too lean to be used unblended as the stuffing material; bacon from the belly cut is to fat. It has been found that by experiment that a blend approximating 70% bacon from the loin cut and 30% from the belly provide when comminuted and mixed an optimum fat content. Of course the same proportion of fat could be obtained in different ways as for example by using the loin cut solely, with part of the lean removed or the belly cut alone, removing most of the fat. These however would ordinarily be uneconomical methods of obtaining the correct proportions of fat and lean for the mixture.

The bacon being a smoked and cured product is relatively stiff and has a decided texture so that when comminuted it forms a loose mass of granules or particles quite different from the adherent pasty mass which results from the comminution of fresh pork and of which fresh sausage meat is an example. If the comminuted bacon without any other treatment were stuffed into the sausage casings, not only would the appearance of the sausage be different from that of ordinary fresh pork sausage on account of the prominence and natural redness of the lean particles, but when cooked, the bacon would fall out of the cut sausage in a mass of loose crumbles making it objectionable from the standpoint of the form in which it is eaten.

Therefore, after grinding the proper proportion of loin and belly bacon, the mass is mixed in an agitator, breaking down the tissues of the lean particles and the fat assuming the emollient condition of lard. The mixing is done at ordinary room temperature. In the mixing, the lean particles become coated with the fat and the mass assumes a homogeneous plastic consistency practically identical with that of fresh sausage meat. It is then stuffed in the casings and the sausage is then complete. No further processing, smoking or other treatment is necessary. The creosote in the smoked bacon will be absorbed into the casings imparting to them keeping qualities which do not exist in the casings of fresh pork sausage.

Not only will the sausage of the present invention keep much longer than fresh pork sausage, but its simulative characteristics are not altered by the preservative, a fact which is not the case with respect to fresh pork sausages, which cannot by any obvious means or method be treated with a preservative without affecting their appearance or physical character and removing them altogether from the class of fresh sausages.

What I claim is:

1. Sausage simulative in appearance of fresh pork sausage, but with superior keeping qualities, comprising an unsmoked substantially transparent sausage skin filled with a mass consisting of an intimately mixed comminuted mixture of a major proportion of lean smoked bacon and a minor proportion of fat smoked bacon, the fat content being sufficient to coat the lean particles and to give the mixture substantially the consistency of fresh pork sausage meat, the creosote from the bacon absorbed by the skin imparting keeping qualities to the latter without materially impairing its transparency.

2. Sausage simulative in appearance of fresh pork sausage but with superior keeping qualities, comprising an unsmoked substantially transparent sausage skin filled with a mass consisting of an intimately mixed comminuted mixture of approximately 70% smoked bacon from the loin cut and 30% smoked bacon from the belly cut, in which the fat content is sufficient to coat the lean particles and give the mixture substantially the consistency of fresh pork sausage meat, the creosote from the bacon absorbed by the skin imparting keeping qualities to the latter without materially impairing its transparency.

3. The method of producing an unsmoked sausage simulative in appearance of the fresh pork sausage comprising intimately mixing the comminuting a major proportion of smoked lean bacon and a minor proportion of smoked fat bacon, the fat content and the mixing being such as to coat the lean particles and to give the mixture substantially the consistency of fresh pork sausage meat, and stuffing the mixture into a substantially transparent sausage skin.

4. The method of producing an unsmoked sausage simulative in appearance of fresh pork sausage, comprising intimately mixing and comminuting a 70% proportion of smoked bacon from the loin cut and a 30% proportion of smoked bacon from the belly cut, the fat content and the mixing being such as to coat the lean particles and to give the mixture substantially the consistency of fresh pork sausage meat, and stuffing the mixture into a substantially transparent sausage skin.

WALTER FRANK.